United States Patent [19]
Chartet

[11] 3,823,464
[45] July 16, 1974

[54] METHOD OF SECURING TOGETHER TWO ALUMINUM CONTAINING PARTS

[75] Inventor: Andre Chartet, Meudon, France

[73] Assignee: Societe Anonyme des Usines Chausson, Asnieres, France

[22] Filed: Mar. 19, 1973

[21] Appl. No.: 342,357

Related U.S. Application Data
[63] Continuation-in-part of Ser. No. 93,823, Nov. 30, 1970, abandoned.

[30] Foreign Application Priority Data
Dec. 1, 1969   France .......................... 69.41380

[52] U.S. Cl. .................. 29/470.5, 29/479, 29/483, 29/489, 29/525
[51] Int. Cl. ............................................ B23k 31/02
[58] Field of Search .......... 29/470.5, 475, 478, 479, 29/482, 483, 489, 525

[56] References Cited
UNITED STATES PATENTS

| | | |
|---|---|---|
| 1,753,258 | 4/1933 | Zerk .................................. 72/703 |
| 2,364,109 | 12/1944 | Taylor ............................. 29/470.5 |
| 2,988,811 | 6/1961 | Huet ............................. 29/157.14 X |
| 3,500,538 | 3/1970 | Raciti ............................. 29/489 X |

FOREIGN PATENTS OR APPLICATIONS
397,898   8/1933   Great Britain

Primary Examiner—Richard B. Lazarus
Attorney, Agent, or Firm—Dwight H. Smiley, Imirie and Smiley

[57] ABSTRACT

A method of securing two aluminum parts, one within the other, comprising deforming the material of one part in the area to be secured to the other part to create groove spaced protrusions extending beyond the normal boundary of the engaging area of the other part, pressing said parts together to engage said protrusions with the boundary of the other part with sufficient friction to retain said parts in position, and then submitting said engaged parts to brazing operation, the protrusions being partly compressed and deformed into the grooves so as to provide passages permitting flow, by capillary action, of liquid brazing alloy thereto.

6 Claims, 3 Drawing Figures

PATENTED JUL 16 1974 3,823,464
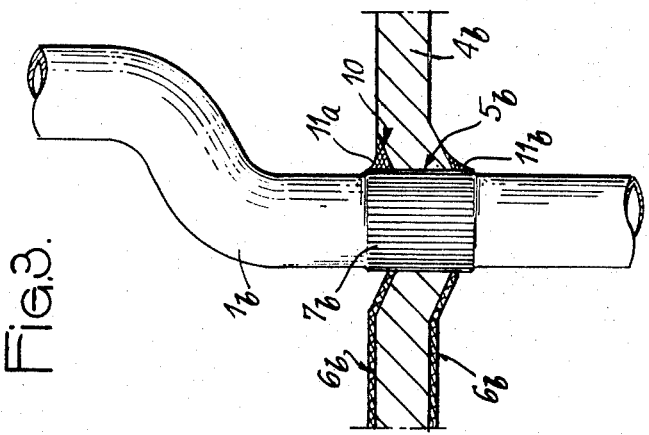
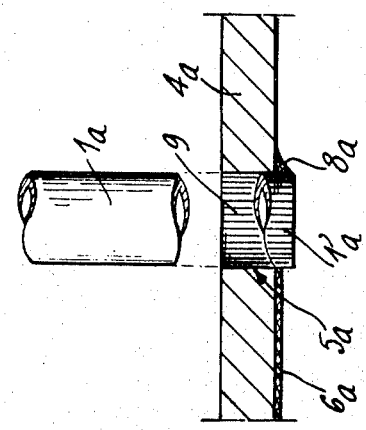
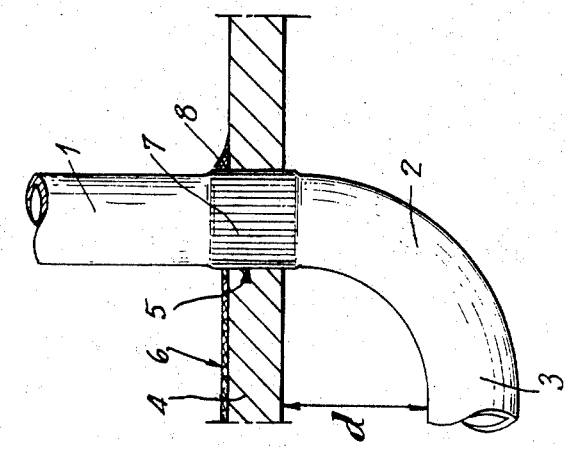

METHOD OF SECURING TOGETHER TWO ALUMINUM CONTAINING PARTS

CROSS-REFERENCE TO RELATED APPLICATION

This application is a continuation-in-part of application Ser. No. 93,823, filed Nov. 30, 1970 and now abandoned.

BACKGROUND OF THE INVENTION

In various devices which are made of aluminum or aluminum alloys, the parts of which are secured together by brazing with an aluminum alloy, it is necessary that some of the parts have a very precise axial and angular disposition with respect to other parts. Brazing is used, for example, in the fabrication of heat exchangers or radiators, particularly those for cooling oil or water of motors in which inlet and outlet pipes have to be precisely located in the collectors of such devices.

Particularly, in some oil cooling radiators, the inlet and outlet pipes which are not rectilinear have to be very precisely fitted, and, therefore, it is necessary to use holders temporarily for maintaining said pipes with respect to the heat exchanger collectors. Such holders prevent displacement of said pipes both axially and angularly during the brazing operations.

It is very difficult to make such holders with the necessary precision and accuracy by usual systems of industrial manufacturing, and they are heavy which complicates the brazing operations because they cool down the brazing salt baths or they prevent the rise in temperature of the parts to be brazed according to whether the brazing is made in a flux bath or in an oven.

SUMMARY OF THE INVENTION

The present invention provides a method of brazing together a pipe and a plate without the use of holders while insuring that the pipes or other parts are not displaced during the brazing operations. Moreover, the invention increases the quality of the brazing which is made when said invention is embodied for the connection of parts of any shape with collectors.

According to the invention, in the method of securing together a part and a support, both made of aluminum or aluminum alloys, the support is provided with an aperture of a size corresponding exactly to the outer wall size of the portions of the part which is to be engaged and that portion of the part of the wall or the support aperture or opening is milled, knurled, or corrugated to provide alternate protrusions and grooves, with the protrusions extending beyond, inwardly or outwardly of said wall size as the case may be, so that upon insertion of the part in the aperture the protrusions frictionally engage the opposite surface and are partly compressed and deformed into the grooves to firmly retain the part and support in proper relative position. In this manner there are provided passages permitting the flow, by capillary action, of liquid brazing alloy thereto. The assembly then is submitted to brazing in which the liquid brazing alloy flows by capillary action into the passages which remain of the grooves, whereby the latter are filled with the brazing material and a brazing fillet is formed around the part and at least one side of the support, thereby brazing the engaged parts.

The process of the present invention accordingly differs in principle from that disclosed in Taylor, U.S. Pat. No. 2,364,109, which relates to the making of steel crankshafts by a welding operation, in which the crankpin members are provided with external serrations which fit tightly into corresponding serrations on the inner surface of crank arm members into which the crankpins are fitted, and no substantial deformation or flattening of the serrations occurs.

In the present invention, the parts are forcibly engaged with the result that the protrusions are in part flattened, but not sufficiently to completely close the groove passages. This results in formation of very thin capillary passages which remain open allowing circulation of fluid suitable aluminum brazing alloy.

BRIEF DESCRIPTION OF THE DRAWING

FIG. 1 is a diagrammatic view in elevation, partly in section, of a tube and a plate secured together, the left side illustrating the assembly prior to brazing and the right side after brazing, and FIGS. 2 and 3 are elevational sections similar to FIG. 1 and showing two different embodiments.

DETAILED DESCRIPTION OF THE INVENTION

FIG. 1 shows a part 1, specifically a tube, having a bent portion 2 and a rectilinear part 3 beyond said bent portion. This tube has to be secured by brazing to a support in the form of a plate 4 with the rectilinear tube part 3 disposed at a precise distance $d$ from the near surface of the plate 4 and at a precise angle with respect to said plate 4. Both the tube 1 and the plate 4 are made of aluminum or aluminum alloy.

According to the present method of securing the tube to the plate, a hole 5 is made in the plate 4, said hole having smooth walls with a shape and size corresponding as exactly as possible to the shape and size of tube 1. In the example shown, the tube 1 is of a circular section so that the hole 5 is of a circular section and has a diameter substantially the same as the outer diameter of said tube 1. Preferably, the plate 4 is provided, on at least one side thereof, with a coating or layer 6 of a brazing alloy, for example a plated coating of aluminum silicon alloy which may contain from 2 to 12 percent of silicon, The peripheral portion of tube 1 which has to engage the plate 4 is knurled or milled to deform only the outer wall portion and provide protrusions and grooves 7. This milling or knurling advantageously may be made by means of rollers so that parts of said milling or knurling are slightly protruding with respect to the original face of the tube whereby the external diameter or protrusions of the knurled portion 7 is slightly greater than the inner diameter of the hole 5. The wall of the hole 5 is free of any brazing alloy while the brazing alloy 6 covers at least one side of plate 4.

To position the tube 1 in the plate 4, the tube is slidably inserted with easy fit through the hole 5 until engagement of the knurled portion 7 with the plate. Frictional engagement then is made by forcing the knurled portion 7 into said hole 5, the protrusions of the knurled portion being compressed and deformed at least in part in the adjacent grooves. Because of this tight fitting, it is possible to precisely fix the distance $d$ as well as the angle that the rectilinear portion 3 of tube 1 is disposed with respect to the plate 4.

The plate and tube assembly is then brazed, for example by dipping the assembly in a molten salt bath, or, after fluxing, by passing it through a brazing oven. The temperature of the tube and plate causes melting of the brazing coating 6. The grooves of the knurled portion 7, which are partially filled when the protrusions are deformed, are completely filled with the melted brazing alloy by capillary action. The brazing operation provides, moreover, a fillet 8 around any knurled portion protruding above plate 4.

FIG. 2 shows another embodiment wherein the portion of the tube 1a, to be fitted within the plate 4a is smooth, but the walls 9 of hole 5a are milled or knurled to define grooves between protrusions extending inwardly beyond the circumferential area of the tube. The milled or knurled formation on the walls 9 may be directly obtained by means of the cutting tool used for boring the hole 5a. The inner diameter of the hole 5a is then slightly smaller than the outer diameter of tube 1a, whereby the end of said tube 1a may be forcibly engaged, which deforms the protrusions on the wall 9 while forming a slightly abraided area 1'a on the wall of tube 1a. In this case, capillary action during the brazing operation will fill any remaining grooves between the protrusions of the wall of hole 5a as well as the grooves or scratches on the area 1'a of tube 1a. The layer of brazing alloy 6a is shown as on the lower surface of the plate 4a and the brazing operations forms a fillet 8a around the protruding end of the tube.

FIG. 3 illustrates a variation according to which the plate 4b is a thin plate as frequently is the case for the plates which are used for making collectors in heat exchangers. In this case to increase the contact surface between the wall of the hole 5b and the milled or knurled area 7b of tube 1b, a small depression or cup 10 is formed in the plate and in the bottom of which the hole 5b is drilled. The height of the hole wall which thus is made is increased relative to the walls of plate 4b since the hole extends through an oblique wall of the plate. In this way, the tube 1b may be positioned still more precisely in the plate 4b and tightly maintained during the brazing operations. Coatings of brazing alloy 6b must be provided on both sides of the plate 4b, whereby obtaining both the filling of the grooves within by the knurled portions 7b and two brazing fillets 11a, 11b.

The method of securing hereinbefore described may have various applications but it has a particularly advantageous application in the brazing of inlet and return pipes for the circulation of fluid in heat exchangers for motor vehicles.

The invention is not limited to the embodiments shown and described in detail, since various modifications thereof may be applied to these embodiments without departing from the scope of the invention as defined in the appended claims. Particularly, it is also possible to make the brazing without using plates having a brazing alloy coating, the brazing alloy may be brought under the shape of a wire or even be contained in the melted salt bath.

What is claimed is:

1. A method of securing two aluminum containing parts, one within the other, comprising:
   deforming the material of one part at the area to be secured to the other part to create groove spaced protrusions extending beyond the normal boundary of the engaging area of the other part;
   pressing said parts together to engage said protrusions with the boundary of the other part with sufficient friction to retain said parts in position, said protrusions being partly compressed and deformed into the grooves, so as to provide passages permitting flow, by capillary action, of liquid brazing alloy thereto, and
   brazing said engaged parts with a liquefied aluminum brazing alloy such that the brazing alloy flows by capillary action into said passages.

2. A method according to claim 1 wherein said one part is elongated and of uniform cross-sectional dimensions and said other part is a plate, the step of providing a hole in said plate of cross-sectional dimensions to slidably receive said elongated one part, and forming said protrusions on one side of the area of said one part to be secured within said hole on the wall of said hole.

3. A method according to claim 2 wherein said brazing is effected to cause said brazing alloy to fill the remainder of said grooves by capillary action and form a fillet between said one part and on at least one side of said plate.

4. A method as set forth in claim 2 comprising the priliminary step of coating at least one side of said plate with brazing alloy, whereby brazing material is provided for said brazing step.

5. A method as set forth in claim 2 wherein the protrusions are made by knurling.

6. A method as set forth in claim 2, comprising deforming said plate to form a frusto conical recess therein, and then boring said hole through the center of said frusto conical recess, so that the height of the wall of said hole is increased relative to the walls of said plate, the diameter of the hole being smaller than the diameter of the frusto conical recess, said hole and recess being coaxial.

* * * * *